United States Patent
Knott et al.

(10) Patent No.: US 6,847,711 B2
(45) Date of Patent: Jan. 25, 2005

(54) METHOD FOR EVALUATING CUSTOMER CALL CENTER SYSTEM DESIGNS

(75) Inventors: Benjamin A. Knott, Round Rock, TX (US); Robert R. Bushey, Cedar Park, TX (US)

(73) Assignee: SBC Properties, L.P., Reno, NV (US)

(*) Notice: Subject to any disclaimer, the term of this patent is extended or adjusted under 35 U.S.C. 154(b) by 3 days.

(21) Appl. No.: 10/366,069

(22) Filed: Feb. 13, 2003

(65) Prior Publication Data

US 2004/0161096 A1 Aug. 19, 2004

(51) Int. Cl.[7] .......................... H04M 3/00; H04M 5/00; G06F 17/60
(52) U.S. Cl. ............................ 379/265.06; 379/265.05; 379/265.07; 705/11
(58) Field of Search ................... 379/265.02, 265.05, 379/265.06, 265.07, 265.08; 705/7, 8, 10, 11

(56) References Cited

U.S. PATENT DOCUMENTS

| | | | |
|---|---|---|---|
| 6,493,446 B1 * | 12/2002 | Cherry ................. | 379/265.05 |
| 2001/0032120 A1 * | 10/2001 | Stuart et al. ................. | 705/11 |
| 2003/0009373 A1 * | 1/2003 | Ensing et al. ................. | 705/10 |
| 2004/0111310 A1 * | 6/2004 | Szlam et al. ................. | 705/8 |

* cited by examiner

*Primary Examiner*—Benny Tieu
(74) *Attorney, Agent, or Firm*—Baker Botts L.L.P.

(57) ABSTRACT

A method of evaluating a design for a call center system. A particular system is put into use and data collected to quantify various quality of service factors. Each quality of service factor is multiplied times an expense multiplier and added to an agent cost factor. The result is a metric that describes the system in monetary terms.

7 Claims, 1 Drawing Sheet

|         | CS  | EC | TC  | EC | TIS | EC  | AT | AER |
|---------|-----|----|-----|----|-----|-----|----|-----|
| DESIGN 1| 80% | 2  | 90% | 1  | 2   | .02 | 2  | .05 |
| DESIGN 2| 70% | 2  | 90% | 1  | 3   | .02 | 3  | .5  |

METHOD FOR EVALUATING CUSTOMER CALL CENTER SYSTEM DESIGNS

TECHNICAL FIELD OF THE INVENTION

This invention relates to customer call center services, and more particularly to a method for comparative evaluation of different call center systems.

BACKGROUND OF THE INVENTION

Customer call centers are increasingly using automated self-service systems. Self-service call center systems are much less expensive than those using live service agents. A well designed self-service system can cost as little as 10% as a system using live agents.

Because of this potential savings, today's call center service providers desire to increase the number of self-service calls relative to agent-assisted calls. However, when deciding among various designs for self-service applications, there are considerations in addition to savings. Specifically, the service provider must consider whether, in addition to reducing agent costs, a particular design can achieve quality of service goals, such as high customer task completion, high customer satisfaction, and short call duration.

Conversion of a call center system from agent-assisted to self-service can be accomplished incrementally. The overall goal becomes performing more and more customer tasks with self-service applications, while holding or improving task completion and customer satisfaction.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figures 1, 2:
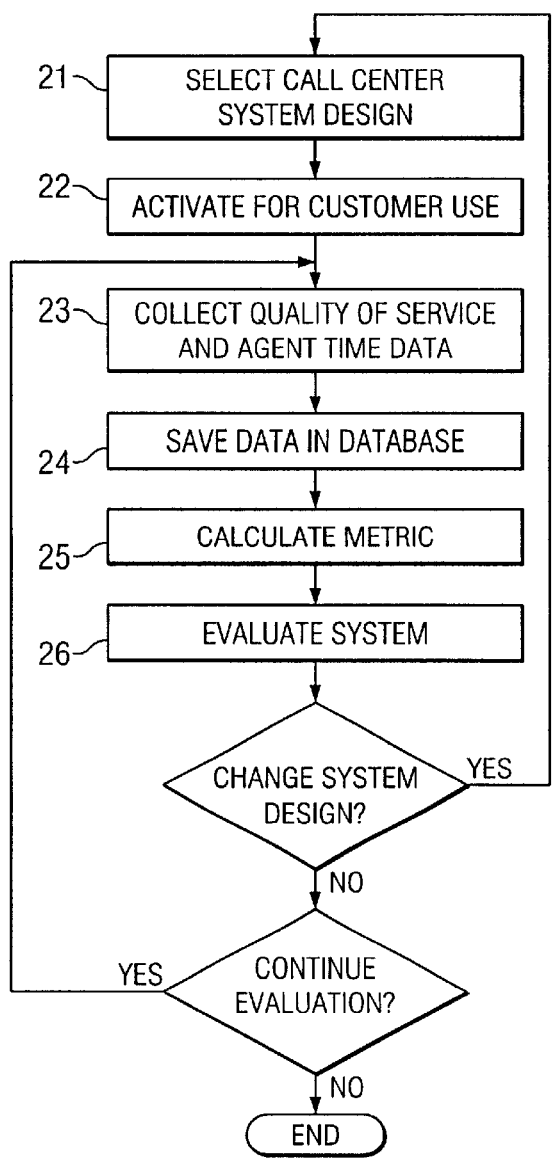
FIG. 1 is a table of cost factor data for two different call center systems.
FIG. 2 illustrates a method of evaluating call center system designs in accordance with the invention.

The invention described herein is directed to comparatively evaluating different designs for call center systems. For self-service systems, these designs are in the form of "applications" in the sense that their implementation is in the form of software for computerized automated systems, examples of which are set out below.

The method is especially useful to evaluate different designs when converting from a call center system in which all or most incoming calls are handled by an agent to a system in which all or most of the calls are self-service. Using the method described herein, a call center service provider can evaluate, in monetary terms, quality of service costs associated with increasing the number of calls being handled automatically. Various design choices that are possible when implementing a self-service application can be evaluated.

In moving from agent-assisted calls to self-service calls, an important issue is how much does the call center value quality of service factors, such as customer satisfaction, time in system, and task completion. When these factors are quantified into monetary values, this is known as "factor pricing", which is important because it helps to determine the relationship between self-service and its potential quality of service variables. One potential self-service design might have better quality of service but might be more expensive. A decision must be made as to the extent to which high quality of service is worth the additional expense.

As explained below, to accomplish factor pricing, each quality of service factor (satisfaction, time in system, and task completion) is multiplied by an expense weighting multiplier. This expense multiplier translates a given factor, such as customer satisfaction, into a dollar amount. This permits trade-offs among the various quality of service factors to be evaluated.

Call centers typically organize their functions into "tasks" requested by calling customers. An example of a frequently requested customer task is to find out how much that customer owes on a bill. If the call center performs that task as an agent-assisted task, the customer calls the call center, then an agent looks up the account and provides the balance due. This simple task call may consume only two minutes or so, but each year there may be millions of this type of call consuming millions of minutes of agent time. Even the most rudimentary self-service designs are capable of handling this task with automated services.

Many customers have multiple tasks to accomplish during each "episode" when they call a call center. For example, a customer might like to learn the price of a particular service, and then, given that the price is acceptable, the customer might like to purchase that service. An agent is easily able to correctly sequence these tasks. Likewise, a self-service application should be capable of adjusting task sequencing in logical order. If a customer were to ask about purchasing a service and how much it costs, the correct and logical sequence is not "purchase then price" but rather "price then purchase". The handling of this sequencing is but one example of a design choice that may be solved differently in different self-service applications. If design choices such as this could be evaluating in terms of monetary value, different design choices could be objectively compared.

Different call center system design alternatives may be evaluated by sampling customer episodes, where each episode may involve one or more tasks. Each design alternative is implemented for a specific time duration, for a sufficient data collection effort to take place. An example of suitable sample size is 1000 tasks.

While a particular design is implemented, data is collected. The data collection is then used to evaluate the design through the use of a mathematical formula, as follows:

$$AM=((1-CS)*EM_{CS})+((1-TC)*EM_{tc})+(TIS*EM_{tis})+(AT*AER),$$

where
AM=application metric
CS=customer satisfaction
EM=expense multiplier
TC=task completion
TIS=time in system
AT=agent time duration
AER=agent expense rate In the above application metric (AM) equation, customer satisfaction (CS), task completion (TC), and time in system (TIS) are referred to herein as "quality of service factors". These factors can be quantified using various data collection methods known in the field of call center service monitoring.

For example, survey type information gathering could be used to discern customer satisfaction and task completion. These two factors are expressed in terms of percentages, with 100% representing complete satisfaction or task completion. Time in system is in terms of units of time.

The expense multipliers (EC's) are not necessarily the same for each quality of service factor. These multipliers may be obtained by economic studies. For example, it might be determined that a 10% decrease in customer satisfaction results in lost revenues of $X in terms of lost accounts, lost goodwill, and other losses. This knowledge can be converted to an expense multiplier, which might, for example, weight a loss in task completion rates more heavily than a loss in customer satisfaction. The expense multiplier for time in system simply translates time to a monetary value.

The last term in the AM equation, AT*AER represents an agent cost factor. This factor decreases as self-service increases.

FIG. 1 is a table of the factor data for two different call center system designs. Based on this data, the AM for Design 1 is calculated as follows:

$$AM = ((1-.80)*2) + (1-.90)*1) + (2*0.2) + (2*0.05)$$
$$= 0.4 + 0.1 + 0.4 + 0.1$$
$$= 1.0$$

The AM for Design 2 is calculated as follows:

$$AM = ((1-.70)*2) + ((1-.90)*1) + (3*0.2) + (3*.5)$$
$$= 0.6 + 0.1 + 0.6 + 1.5$$
$$= 2.8$$

For this simple example of comparing two designs, Design 1 has substantially lower cost than Design 2.

FIG. 2 illustrates a method of evaluating call center system designs in accordance with the invention. In the example of this description, the method is used to evaluate how best to convert from an agent-assisted to a self-service call center system. It is assumed that a number of designs have been developed and are ready for customer use and for evaluation in accordance with the invention.

Step 21 is selecting a system design to be evaluated. Examples of types of systems are touch tone interactive voice recognition (IVR) systems, speech IVR systems, agent assisted systems, and natural language understanding (NLU) systems. Within each type of system, there may be various different designs of that system.

Step 22 is activating the system for customer use. Step 23, which occurs after each customer episode, is collecting the factor data described above, that is, time in system, customer satisfaction, and task completion. As stated above, the data collection can be achieved using call monitoring techniques known in the field of call center applications.

Step 24 is saving this data in a database. This process is repeated for a given number of customer episodes, say 1000, for a particular design. Step 25 is calculating the AM for each of the designs. Step 26 is evaluating the design by comparing its AM with an expected value or with AM values associated with other designs. The method may be repeated for any other designs to be evaluated. The design with the smallest AM indicates the design that should be used.

The above-described method assumes an evaluation system that has a number of capabilities. The system must be able to identify customer tasks, such as by menu or voice recognition. It should be capable of collecting and saving task completion, customer satisfaction, and time in system data. It should be able to then use the above formula to calculate the cost of a given design.

As indicated in FIG. 2, once a particular system design is evaluated, the evaluation system may then also include means for using the results of the comparison to automatically change to a different design. Depending on the results of the AM calculation, the system could route customer calls to a different design to be evaluated. Or, if the evaluation of a number of designs were already known, the evaluating system could route calls to the most favorable design.

When converting to a self-service system, the above-described method may be used to incrementally increase the percent of calls that are self-service. As self-service designs are evaluated and selected, more and more calls can be routed to them.

An additional feature of the evaluation system could be the ability to dynamically adjust the evaluation expense multipliers. More specifically, for a given situation, one or more of the expense weighting factors might change. For example, a call center might have fewer agents at some times, which might increase certain expense factors. Thus, calls might be routed to a different system during those times, as compared to times when there were more agents.

What is claimed is:

1. A method of evaluating a call center system design, comprising the steps of:

selecting a call center system design;

activating the design for customer use;

collecting quality of service data, during a number of customer calls, the data representing quantification of one of more from the following group of quality of service factors: customer satisfaction, task completion, and time in system;

collecting agent time data during the same calls;

storing the quality of service data and the agent time data in a database;

calculating a metric representing the overall cost of the system design, wherein the calculating step is performed by multiplying each quality of service factor and the agent time data by an expense multiplier and by adding the resulting products;

evaluating the metric as compared to metrics representing at least one alternative system design; and determining whether the results of the evaluating step call for re-routing calls to an alternative system design.

2. A method of evaluating a call center system design, comprising the steps of:

selecting a call center system design;

activating the design for customer use;

collecting quality of service data, during a number of customer calls, the data representing quantification of a number of selected quality of service factors;

collecting agent time data during the same calls;

storing the quality of service data and agent time data in a database;

calculating a metric representing the overall cost of the system design, wherein the calculating step is performed by multiplying each quality of service factor and the agent time data by an expense multiplier and adding the resulting products;

evaluating the metric as compared to metrics representing at least one alternative system design; and determining whether the results of the evaluating step call for re-routing calls to an alternative system design.

3. The method of claim 2, wherein one of the quality of service factors is customer satisfaction.

4. The method of claim 3, wherein customer satisfaction is expressed in terms of a percentage.

5. The method of claim 2, wherein one of the quality of service factors is task completion.

6. The method of claim 5, wherein task completion is expressed in terms of a percentage.

7. The method of claim 2, wherein one of the quality of service factors is time in system.

* * * * *